Patented July 21, 1942

2,290,736

UNITED STATES PATENT OFFICE 2,290,736

METHOD FOR THE PRODUCTION OF SPONGE RUBBER

Malcolm R. Buffington, Millburn, and Ellery K. Files, East Orange, N. J., assignors to Mishawaka Rubber and Woolen Manufacturing Company, Mishawaka, Ind., a corporation of Indiana No Drawing. Application February 27, 1935, Serial No. 8,570

16 Claims. (Cl. 260—723)

This invention relates to a method for the making of sponge rubber and more particularly to a method for the production of sponge rubber foam preparatory to and as a part of a vulcanization process for the making of sponge rubber.

In the methods now commonly in use for the making of sponge rubber from latex, a latex containing the ingredients to be vulcanized is whipped or rapidly agitated in the presence of a foam stabilizer, generally with the use of air or other gas which is passed through the mass to produce the air bubbles therein. Such air bubbles or air cells are of non-uniform size and unite or coalesce to a greater or less extent with other adjacent air cells after the agitating process before vulcanization can be effected and in the less viscous masses the larger air bubbles frequently rise to the surface and break or else adhere on the surface and form what is known as "blisters" in the vulcanized product.

The product produced is not uniform and the openings or air cells are of varying size so that the vulcanized rubber mass has the appearance of non-uniformity and the mass does not have as much supporting or cushioning effect as a rubber mass with the same total volume of air space but in which the air is distributed in fine substantially uniform air cells.

In accordance with other processes heretofore used for the making of sponge rubber, ammonium salts are frequently used which decompose on the application of heat slightly below the vulcanizing temperature. Ammonium carbonate, for example, when incorporated into a vulcanizable rubber mass breaks up into ammonia gas and carbon dioxide upon the application of a heat higher than 85° C., whereby the gases are distributed through the rubber, and upon vulcanization the rubber is filled with small bubbles or spaces of varying size.

The temperature of the mass must be maintained during vulcanization above the decomposition temperature of the ammonium salt as otherwise the gases reunite to reform the ammonium salt and the cell collapses before vulcanization is completed. Due to the fact that the ammonium salt cannot be entirely uniformly distributed through the mass the size of the gas cells formed varies to a very considerable extent so that a uniform product is not obtained. Furthermore, due to the fact that the gas forming reaction takes place only immediately before the vulcanization proceeds or else simultaneously with the vulcanization process, the product operated upon is not in a stable state but is changing in volume during a considerable part of the vulcanization reaction.

In one method for the formation of latex sponge, the foam is produced within the latex mass by whipping or agitation and the foam must be dried or jelled before subjecting the mass to vulcanization as otherwise the mass drops or collapses and coagulation of the latex takes place with separation of liquid, forming a non-uniform product.

Some methods for the formation of sponge rubber employ the use of open steam pressure in the attempt to prevent the break-down of the foam, but nevertheless there is a greater or less coagulation of the latex particles and dropping of the foam mass during vulcanization in all of the processes heretofore employed, including those in which gas is developed during the vulcanization process itself.

In none of these processes can the material be passed directly into a heating oven or zone in which the temperature is above 100° C., without contraction or a breaking-down of the cell structure. In such processes the heating must be initiated at a temperature substantially below 100° C., or else coagulation takes place, and if the heating takes place too slowly there is a greater or less collapse of the cell structure in the foam mass due to the breaking down of the foam and coalescing of the air or gas particles thereof.

The present invention is based upon the discovery that a foam may be formed entirely separately from the rubber mass to be vulcanized and may be transferred to and incorporated into the rubber mass so as to be uniformly distributed therethrough by gentle stirring and admixture. It will be understood that it is extremely difficult to develop a fair degree of foam in an aqueous rubber dispersion by the methods heretofore used, even with the use of foam stabilizers and that rapid agitation or stirring of latex or aqueous rubber dispersions frequently produces coagulation of the latex, causing separation of masses of rubber within the foam. The method of our invention serves to produce a high degree of foam with a minimum amount of stirring or agitation of the latex, so as to obtain the foam mass in a minimum amount of time and cost, and in such a manner that in no case does the latex or aqueous rubber dispersion coagulate upon the production of the foam in the rubber mass.

In the method which we have developed the rubber foam mass may, as soon as it is formed, be inserted directly into an oven or heating chamber in which the temperature is considerably above 100° C., without reducing the foam or breaking down the cell structure to any appreciable extent. As soon as the mass is subjected to a temperature at which coagulation of the albumen or other organic material employed takes place, the reaction proceeds immediately to first produce a supporting frame structure or solid cellular framework holding the rubber mass rigidly in place, after which vulcanization proceeds after the vulcanization temperature is reached so that during the entire vulcanization process the particles of the rubber mass are rigidly held in place.

One of the objects of our invention is to form a sponge rubber foam without the necessity of rapid agitation of the latex to form the foam prior to the vulcanization of the rubber mass and thereby to avoid coagulation of the rubber particles of the dispersion prior to vulcanization.

Another object of the invention is to provide a foam structure without the use of ammonium compounds or other gas forming materials for the liberation of gas during vulcanization of the rubber mass, and to provide a foam structure which is sufficiently buoyant to maintain the form structure or cellular structure substantially rigid during the entire vulcanization process.

Another object of the invention is to provide a method for the preparation of sponge rubber foam preparatory to and as a part of the vulcanization process by which the foam structure itself may be prepared entirely separately from the rubber mass and thereafter incorporated into the rubber mass or aqueous rubber material without substantial stirring or agitation. In accordance with this invention the stirring or agitation necessary for the production of the foam is carried on outside of the body of the rubber dispersion or rubber mass to be vulcanized, and air bubbles of substantially uniform size are then homogeneously distributed through the rubber mass by very gentle agitation or mixing, after which the foaming product may then be subjected to the vulcanization process in the usual way without causing collapse of the structure or separation or coagulation of rubber masses in the product during the heating operation.

Another object of the invention is to provide a method for the preparation of sponge rubber foam which avoids substantial stirring of the rubber ingredients and which will produce a temporary set-up or supporting framework structure which is sufficiently rigid so that after formation of the cellular rubber mass substantially no change takes place in the structure of the foamy rubber mass during the vulcanization procedure.

Another object of the invention is to provide a method by which gas may be generated in the foam producing material itself without the use of high temperatures and by which gas may be liberated in the form of bubble structure and readily distributed through the mass prior to vulcanization, thereby avoiding stirring or substantial agitation and danger of causing coagulation of the rubber particles in the mass which would disturb rubber particle distribution in the mass.

With these and other objects in view, the invention comprises the various features hereinafter more fully described and particularly defined in the claims.

The preferred method of carrying out the invention may now be described as follows:

We separately prepare a foam or foam structure from a coagulable organic material, preferably a protein, such as ordinary egg albumen, which may be coagulated to a firm mass at a temperature below ordinary vulcanization temperatures. By the use of egg albumen, which coagulates at a temperature below the boiling point of water and incorporating this material in the form of a foam into the rubber mass, a cellular structure is formed adapted to form a rigid framework structure upon being subjected to treatment for the coagulation of the said material, whereby the water of the mass which is in the continuous phase of the dispersion will not separate or be vaporized to any substantial extent during the treatment.

After the foam structure has been formed separate from the rubber mass, the foam mass is combined without substantial agitation with the aqueous rubber dispersion or rubber mass to be vulcanized. The combining of the foam with the rubber mass is preferably carried out by gradually pouring the foam into the rubber mass and gently stirring or agitating the mass during admixture, so as to gradually distribute the foam homogeneously throughout the body of the latex or rubber mass but without agitation to the extent which would cause coagulation of the latex or other rubber mass. As soon as a homogeneous foam-rubber dispersion admixture is obtained, the mass is then distributed upon the fabric or body upon which the sponge rubber structure is to be provided, or the mass may be poured into a mold to be vulcanized.

As an example of the preferred manner of carrying out the invention we preferably employ fifteen parts of a 10% egg albumen solution in water. This solution is agitated by means of a suitable agitator by which air is incorporated into the solution to produce a homogeneous foam. To this foam is added 100 parts of a 60% latex or aqueous rubber dispersion compounded with sulfur compounds, zinc compounds and a suitable accelerator to permit vulcanization at a relatively low temperature. The latex or rubber dispersion and the foam are gently agitated or stirred together so as to produce a homogeneous admixture. The product may then be directly spread upon fabric, using the ordinary doctor or spreading device, to provide the desired thickness of the product on the fabric, or it may be poured into molds and entered immediately into ovens or presses heated higher than 100° C., to produce vulcanization of the rubber in the product. As the product is heated the albumen constituent coagulates substantially immediately so as to produce a supporting framework structure which prevents sagging of the rubber mass, and permits vulcanization so as to retain substantially the original rubber structure and consistency.

It is obvious that the proportions of the constituents employed may be varied within operative limits as will be apparent to those skilled in the art and that various latices or aqueous rubber dispersions may be compounded, jelled or thickened by any of the well known methods as now employed. Various pigments or colors may be incorporated into the foam so as to obtain substantially any desired color in the rubber mass, the foam structure having a sufficient rigidity to permit incorporation of various dyes or pigments without interfering with the coagulation of the protein or other coagulable material or with the formation of the vulcanized sponge rubber mass.

In connection with the egg albumen we preferably incorporate a coagulant for the latex, such as basic aluminum acetate, for example, which coagulant is insoluble in cold water but decomposes in hot water to form aluminum hydroxide and acetic acid. A very small percentage of basic aluminum acetate suffices to produce the coagulation of the latex, which however is retarded until after the albumen or coagulable organic material has been coagulated by heat. The liberated acetic acid causes the coagulation of the rubber in the dispersion, the thus coagulated rubber then assisting in forming the framework or cellular structure which entraps the air particles and holds the mass rigid until the rubber becomes vulcanized.

Under some conditions it is particularly desirable to assist in separately forming the foam mass before incorporating it with the latex or rubber mass by generating a gas during agitation of the protein solution; or under some conditions the foam body may be formed entirely by the suitable generation of the gas within the albumen solution or coagulable mass of organic material. For this purpose we preferably generate a gas by adding hydrogen peroxide to the protein solution, which, as is well known, decomposes with formation of water and the liberation of oxygen within the mass.

If desired we may substitute for the gas generating ingredient the combination of zinc with caustic alkali solution which react to liberate hydrogen within the protein solution and may be suitably distributed throughout the mass by stirring to form a uniform foam structure. The foam mass obtained in this manner may then be incorporated or combined with latex or rubber mass as above described.

In some instances we may also employ a combination of protein or coagulable organic masses by the use of a small percentage of egg albumen together with other proteins or coagulable organic materials. For this purpose we preferably employ a mild jelling agent which may be added to the protein solution. It will be obvious that in connection with the use of egg albumen alone it is not necessary to employ such jelling agents for the reason that the albumen foam readily coagulates upon the application of heat, such coagulation beginning at a temperature of about 85° C.

By the use of the method as above described it will be obvious that by the addition of a definite bubble structure or foam body to the rubber mass to serve as a supporting or framework bubble structure through which the rubber dispersion is distributed, the resulting admixture comprises a dispersion in which water is the continuous phase and rubber is the dispersed phase but in which air or other gas employed becomes entrapped through the surface tension of the liquid in uniform bubble size so as to form a network or cellular framework which as soon as the albumen or coagulable material is coagulated forms a permanent supporting framework structure which supports the rubber particles uniformly throughout the mass so as to permit vulcanization without substantial change of form of the entire rubber mass.

It will be understood that we prefer the use of egg albumen in the process of my invention for the reason that this material is self-stabilizing and it is unnecessary to employ any of the usual stabilizers in connection with the foam produced therefrom. It will be understood, however, that we may add or incorporate other ingredients in addition to egg albumen for the purpose of changing or modifying the characteristics or physical properties of the foam body. We may, for example, add saponin to the albumen solution which serves to increase the ability of the egg albumen to form a foam. We may also add peroxide, as above described, or we may add zinc or aluminum with alkali in order to generate gas within the foam body to increase the bubble formation within the foam. While we prefer to add or incorporate the bubble forming material within the body of the foam before it is added to the latex, it will be understood that the saponin ingredient or the bubble forming components may be added to the body of the latex while the foam mass is being incorporated into the latex body. By this means the bubble size of the foam may be increased in the body of the latex, the peroxide, or the metal and alkali, being added at such a point directly to the latex so that by the time that the foam body has been incorporated into the latex, the bubble liberation within the latex body from the peroxide or from the metal and alkali will be substantially completed so that the mass may be put directly into the vulcanizing ovens.

In place of egg albumen as a protein material, we may employ other protein or proteins which will form a suitable foam structure outside of the latex mass so that the foam body may be directly incorporated in the manner as above described in connection with the use of egg albumen. We have found, however, that gelatin alone does not produce a satisfactory result in the formation of a foam body as the foam structure is not sufficiently stable to permit incorporation into the latex body after its formation. We have found, however, that gelatin and other proteins as glue, casein and blood albumen may be satisfactorily converted into a foam by the addition of saponin to a solution of any of the said proteins or mixtures thereof. We have found, for example, that a mixture of casein and gelatin in substantially equal proportions together with a relatively small proportion of saponin forms a mixture which by agitation in the manner above described may be converted into a foam body. To this composition we preferably add from one to two percent of basic aluminum acetate which may be incorporated into the foam or into the latex mixture, this material serving to set the mixture before the foam breaks down when the mass is entered into an oven or subjected to a temperature above 100° C. We have also found that hexamethylene tetramine or para-formaldehyde will assist in connection with the foam mixture to make the casein or gelatin insoluble, but the addition of these materials is not necessary to obtain a satisfactory result.

As a further specific example of the use of a protein material other than egg albumen, we may state that we have prepared foams by adding one part of saponin to about sixty parts of a solution containing two percent of casein or gelatin and with from one to two percent of basic aluminum acetate the foam being formed prior to admixture with about three hundred parts of compounded sixty percent latex.

In connection with the use of hexamethylene tetramine or para-formaldehyde in admixture with gelatin or casein, this material apparently serves to gradually evolve formaldehyde on being heated and assists in the coagulation of the protein material upon the application of heat to form the structural framework serving to hold the rubber mass in place during the vulcanization process.

The rubber may obviously be put into a mold so as to provide the desired final form of the sponge rubber or it may be spread into sheets so as to form rubber mats of a desired size, form and thickness; or it may be distributed upon a suitable fabric backing such as a woven fabric or upon a pile fabric or a cemented pile fabric; or upon leather, imitation leather or upon metal or other suitable backing.

The material is particularly advantageous in forming a mat or support for small objects by permanently attaching or forming the backing so as to be united to the object which may be placed upon highly polished surfaces, such as furniture, without scratching or injuring the surface thereof. It is also particularly advantageous in forming a matting or supporting surface for electric fans and other electrically operated devices so as to cushion the vibration during operation and to produce a smoother running thereof and to serve as a sound reducing or noise preventing medium.

While the invention as above described constitutes the preferred mode of carrying out our invention it has been found that the method may be modified to some extent while still employing the basic principles of our invention. We have found, for example, that we may prepare a foam outside of the body of latex or aqueous rubber dispersion using a non-coagulable foam producing material instead of a coagulable foam producing material, the body of foam being formed by agitation of the non-coagulable material in water in the same manner as above described with reference to the use of a coagulable protein material. The foam is then introduced into a body of aqueous rubber dispersion and agitated or thoroughly mixed to produce a homogeneous, foamy mass. Into the said foamy mass is introduced a constituent adapted to produce coagulation of the rubber particles prior to vulcanization, as for example by suitably raising the temperature of the mass. For this purpose we may employ basic aluminum acetate or other coagulating material which serves to act on the latex or rubber dispersion either by increase of temperature of the mass or by direct chemical action.

A protective agent, such as starch or a gum is preferably added to the body of latex or aqueous rubber dispersion, which protective agent combines with the foam forming agent, such as saponin, soap, licorice and stabilizes the foam sufficiently until the coagulant, such as basic aluminum acetate, reacts to coagulate the rubber of the mass and thereby form the supporting medium for the foamy mass during the vulcanization step. It is to be understood that while this modification of the method serves to fulfill the conditions, that is of preventing sagging or collapse of the foam structure during vulcanization, the preferred method as above described involving the use of egg albumen produces the best results under ordinary conditions.

It will be obvious, therefore, that various changes and modifications in the method as described may be made without departing from the spirit or scope of the invention as hereinafter defined in the claims.

Having thus described the invention, what is claimed as new is:

1. A method for the production of sponge rubber which comprises separately preparing a foam stable in latex from a coagulable organic material comprising mainly a gelatinous substance in water, thereafter combining the said foam with an aqueous dispersion of rubber and coagulating the said organic material to provide a supporting framework for the rubber mass and vulcanizing the said mass.

2. A method for the production of sponge rubber which comprises separately preparing a coagulable protein mass, forming a foam from the said protein mass, combining the said foam mass with an aqueous dispersion of rubber to produce a homogeneous admixture in which the foam is distributed through the said mass, coagulating the said protein mass to produce an initial set-up of the protein to form a supporting cellular framework structure of sufficient rigidity to hold the rubber mass in place during the vulcanization process and thereafter vulcanizing the said rubber mass to provide a rubber structure having the said cellular framework structure.

3. A method for the production of a sponge rubber foam preparatory to vulcanization which comprises separately preparing an aqueous egg albumen foam, combining the said foam with an aqueous dispersion of rubber to produce a homogeneous admixture in which the foam is uniformly distributed through the mass, heating the product to produce coagulation of the albumen to provide a supporting framework structure to prevent collapse of the cells of the said structure during vulcanization and thereafter vulcanizing the said rubber mass so as to retain the said framework structure in the vulcanized product.

4. A method for the production of sponge rubber which comprises separately preparing an aqueous solution of egg albumen, agitating the albumen solution to form a homogeneous cellular or foam structure, mixing the said foam with rubber latex, heating the said admixture before any substantial collapse of the foam structure takes place to coagulate the albumen and to provide an initial framework structure of sufficient rigidity to hold the rubber particles in place during vulcanization and thereafter vulcanizing the mass to produce sponge rubber having the said supporting framework or cellular structure therein.

5. A method for the production of sponge rubber which comprises separately forming a foam stable in latex from a coagulable organic material including a gelatinous organic constituent and water together with saponin to accelerate the foam formation during agitation of the mass, combining the resulting body of foam with an aqueous dispersion of rubber containing compounding ingredients therein, coagulating the said coagulable organic material to form a rigid supporting medium for the foamy mass and thereafter vulcanizing the said mass.

6. A method for the production of sponge rubber which comprises incorporating a coagulable protein mass together with saponin into a body of water, agitating the mass to produce a homogeneous foam therefrom, incorporating the said foam together with basic aluminum acetate into an aqueous dispersion of rubber to produce a homogeneous foamy mass, coagulating the coagulable constituents of said foamy mass to produce a supporting medium for the said mass during vulcanization and thereafter subjecting the said mass to heat treatment to vulcanize the mass upon the said supporting medium as a framework to prevent substantial change in the said structure during vulcanization.

7. A method for the production of sponge rubber which comprises incorporating a coagulable protein mass into water, generating a gas within the said body of water and agitating the mass to form a homogeneous foam therefrom, incorporating the said foam together with a rubber coagulant into a body of aqueous rubber dispersion, agitating the resulting admixture to produce a homogeneous foamy mass, coagulating the coagulable constituents of the said foamy mass to form a supporting medium adapted to support the said mass during vulcanization and thereafter vulcanizing the said mass to provide a rubber structure having the said supporting medium as a framework structure therein.

8. A method for the production of sponge rubber which comprises incorporating a coagulable protein mass together with a foam increasing constituent in water, agitating the mass and adding peroxide thereto to generate gas therein and forming a separate foamy mass, incorporating the foamy mass into an aqueous dispersion of rubber and producing a homogeneous foamy admixture therefrom, coagulating the said protein mass to provide a cellular supporting medium serving as a framework to hold the rubber particles in place during vulcanization and thereafter vulcanizing the said rubber mass.

9. A method for the production of sponge rubber which comprises incorporating gelatin admixed with another protein and a foam accelerating ingredient into water, agitating the mass to produce a foamy mass therefrom, incorporating the said foamy mass together with a rubber coagulant into an aqueous dispersion of rubber, agitating the said admixture to form a homogeneous foamy mass therefrom, coagulating the said mass to form a cellular supporting medium for the mass during vulcanization and vulcanizing the said mass.

10. A method for the production of sponge rubber which comprises incorporating gelatin and casein together with saponin into water, forming a foamy mass therefrom, incorporating the said foamy mass together with basic aluminum acetate into a body of rubber latex, treating the said admixture to form a homogeneous foamy admixture, coagulating the said foamy admixture prior to vulcanization thereof to form a supporting medium for the mass during vulcanization and thereafter vulcanizing the said mass.

11. A method for the production of a backed fabric having sponge rubber as the backing medium which comprises separately forming a body of foam by means of agitating a solution of egg albumen to form a homogeneous body of foam, incorporating the said body of foam into an aqueous dispersion of rubber to distribute the said foam therethrough and to produce a homogeneous foamy admixture, applying the said foamy admixture to one side of a fabric, coagulating the albumen so as to form a supporting medium for the foamy mass during vulcanization and thereafter vulcanizing the foamy rubber mass to provide the sponge rubber backing for the said fabric.

12. A method for the production of sponge rubber which comprises separately preparing a foam body from an organic gelatinous foam-forming protein material, water and air, incorporating therein a constituent adapted to assist in coagulating a constituent of said foam body, whereby the foam structure, when combined with aqueous rubber dispersion, is sufficiently buoyant to support the foam mass without substantial sagging during vulcanization, combining the said foam body with a body of vulcanizable aqueous rubber dispersion to form a homogeneous foamy mass and vulcanizing the said mass.

13. A method for the production of sponge rubber which comprises separately preparing a foam body comprising gelatine, casein and saponin, incorporating the said foam into a body of aqueous rubber dispersion, uniformly distributing the said foam through the said mass, adding a setting agent to one of said bodies, causing coagulation by heat in the resulting mass, before the foam breaks down, by means of said setting agent to provide a buoyant substantially homogeneous foam structure which is sufficiently rigid to preserve said structure during vulcanization and heating the mass to vulcanize the rubber thereof.

14. A method for the production of sponge rubber which comprises separately preparing a foam from a foam-forming organic material comprising a heat coagulable gelatinous organic constituent and water, incorporating the said foam into a mass of vulcanizable aqueous rubber dispersion, uniformly distributing the said foam through the said rubber composition, incorporating basic aluminum acetate as a rubber coagulant in the said composition for coagulating the rubber in the mass, coagulating the said gelatinous organic constituent by heat to form a substantially homogeneous foam structure, increasing the heat to cause coagulation of the rubber in the dispersion to form a buoyant structure to support the same during vulcanization and vulcanizing the resulting mass.

15. A method for the production of sponge rubber which comprises separately preparing a foam from a foam-forming organic material comprising mainly a coagulable gelatinous organic constituent water and a gas, thereafter incorporating the said foam into a mass of vulcanizable aqueous rubber dispersion, uniformly distributing the said foam through the said rubber dispersion, incorporating a protective agent for the foam at a stage in the method prior to coagulation, to stabilize the foam, incorporating a coagulent for the rubber of the dispersion at a stage so as to be present in the dispersion at least prior to coagulation of the rubber, coagulating both the said gelatinous constituent and the rubber to provide a rigid foam structure which is sufficiently buoyant to support the said structure during vulcanization, and vulcanizing the resulting mass.

16. A method for the production of sponge rubber which comprises separately preparing a coagulable foam of a character stable in latex from a coagulable organic material, a rubber coagulant and water, uniformly distributing the said foam throughout a body of aqueous rubber dispersion to form a homogeneous foamy mass, coagulating both the rubber and coagulable organic material of said mass to form a supporting structure prior to and during vulcanization and vulcanizing the said mass.

MALCOLM R. BUFFINGTON.
ELLERY K. FILES.